US005492559A

United States Patent [19]
Oliver et al.

[11] Patent Number: 5,492,559
[45] Date of Patent: Feb. 20, 1996

[54] LIQUID CRYSTALLINE MICROEMULSION INK COMPOSITIONS

[75] Inventors: John F. Oliver, Calgary; Marcel P. Breton, Mississauga, both of Canada; Stig E. Friberg, Potsdam; Raymond W. Wong, Mississauga, Canada; William M. Schwarz, Webster, N.Y.

[73] Assignee: Xerox Corporation, Stamford, Conn.

[21] Appl. No.: 325,762

[22] Filed: Oct. 19, 1994

[51] Int. Cl.$^6$ ..................................... C09D 11/02
[52] U.S. Cl. .................. 106/22 E; 106/22 A; 106/27 R; 106/20 D
[58] Field of Search ................ 106/22 A, 22 E, 106/27 R, 20 D

[56] References Cited

U.S. PATENT DOCUMENTS

| | | | |
|---|---|---|---|
| 3,246,997 | 4/1966 | Sumner et al. | 106/22 E |
| 4,840,674 | 6/1989 | Schwarz | 106/22 |
| 4,853,036 | 8/1989 | Koike et al. | 106/20 |
| 4,938,801 | 7/1990 | Yoshioka et al. | 106/27 R |
| 5,006,170 | 4/1991 | Schwarz et al. | 106/20 |
| 5,021,802 | 6/1991 | Allred | 346/1.1 |
| 5,041,161 | 8/1991 | Cooke et al. | 106/22 |
| 5,047,084 | 9/1991 | Miller et al. | 106/27 |
| 5,065,167 | 11/1991 | You et al. | 346/1.1 |
| 5,074,915 | 12/1991 | Yoshioka et al. | 106/27 R |
| 5,122,187 | 6/1992 | Schwarz et al. | 106/25 |
| 5,124,718 | 6/1992 | Koike et al. | 346/1.1 |
| 5,226,957 | 7/1993 | Wickramanayake et al. | 106/25 R |
| 5,342,440 | 8/1994 | Wickramanayake | 106/22 E |

OTHER PUBLICATIONS

"Interfacial Phenomena in Apolar Media", (7 pages), Stig E. Friberg—Chemistry Dept., University of Missouri at Rolla, (no date available).

"A Hot Melt Ink for Thermal Jet Printing"—Journal of Imaging Science ad Technology—vol. 36, #2, Mar./Apr. 1992.

*Primary Examiner*—Helene Klemanski
*Attorney, Agent, or Firm*—Judith L. Byorick

[57] ABSTRACT

Disclosed is an ink composition which comprises an aqueous phase, an oil phase, an oil-soluble dye, and a surfactant, said ink exhibiting a liquid crystalline gel phase at a first temperature and a liquid microemulsion phase at a second temperature higher than the first temperature.

33 Claims, 3 Drawing Sheets

LIQUID CRYSTALLINE MICROEMULSION INK COMPOSITIONS

BACKGROUND OF THE INVENTION

The present invention is directed to ink compositions. More specifically, the present invention is directed to ink compositions particularly suitable for use in thermal ink jet printing processes. One embodiment of the present invention is directed to an ink composition which comprises an aqueous phase, an oil phase, an oil-soluble dye, and a surfactant, said ink exhibiting a liquid crystalline gel phase at a first temperature and a liquid microemulsion phase at a second temperature higher than the first temperature.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink, in excess of the normal boiling point, diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be retired after 100 to 500 microseconds minimum dwell time to enable the channel to be refilled and to enable the dynamic refilling factors to become somewhat dampened. Thermal ink jet processes are well known and are described in, for example, U.S. Pat. Nos. 4,601,777, 4,251,824, 4,410,899, 4,412,224, and U.S. Patent 4,532,530, the disclosures of each of which are totally incorporated herein by reference.

Ink jet printing processes may also employ inks that are solid at room temperature and liquid at elevated temperatures. For example, U.S. Pat. No. 4,490,731, the disclosure of which is totally incorporated herein by reference, discloses an apparatus for dispensing solid ink for printing on a substrate such as paper. The ink dye vehicle is chosen to have a melting point above room temperature, so that the ink which is melted in the apparatus will not be subject to evaporation or spillage during periods of nonprinting. The vehicle is also chosen to have a low critical temperature to permit the use of the solid ink in a thermal ink jet printer. In thermal ink jet printing processes employing hot melt inks, the solid ink is melted by a heater in the printing apparatus and utilized as a liquid in a manner similar to that of conventional thermal ink jet printing. Upon contact with the printing substrate, the molten ink solidifies rapidly, enabling the dye to remain on the surface instead of being carried into the paper by capillary action, thereby enabling higher print density than is generally obtained with liquid inks. Advantages of a hot melt ink in ink jet printing are elimination of potential spillage of the ink during handling, a wide range of print density and quality, minimal paper cockle or distortion, and enablement of indefinite periods of nonprinting without the danger of nozzle clogging, even without capping the nozzles.

In addition, U.S. Pat. No. 4,751,528, the disclosure of which is totally incorporated herein by reference, discloses a hot melt ink jet system which includes a temperature-controlled platen provided with a heater and a thermoelectric cooler electrically connected to a heat pump and a temperature control unit for controlling the operation of the heater and the heat pump to maintain the platen temperature at a desired level. The apparatus also includes a second thermoelectric cooler to solidify hot melt ink in a selected zone more rapidly to avoid offset by a pinch roll coming in contact with the surface of the substrate to which hot melt ink has been applied. An airtight enclosure surrounding the platen is connected to a vacuum pump and has slits adjacent to the platen to hold the substrate in thermal contact with the platen.

Further, U.S. Pat. No. 4,791,439, the disclosure of which is totally incorporated by reference, discloses an apparatus for use with hot melt inks having an integrally connected ink jet head and reservoir system, the reservoir system including a highly efficient heat conducting plate inserted within an essentially non-heat conducting reservoir housing. The reservoir system has a sloping flow path between an inlet position and a sump from which ink is drawn to the head, and includes a plurality of vanes situated upon the plate for rapid heat transfer.

Ink compositions for ink jet printing are known. For example, U.S. Pat. No. 4,840,674 (Schwarz), the disclosure of which is totally incorporated herein by reference, discloses an ink composition which comprises a major amount of water, an organic solvent selected from the group consisting of tetramethylene sulfone, 1,1,3,3-tetramethyl urea, 3-methyl sulfolane, and 1,3-dimethyl-2-imidazolidone, which solvent has permanently dissolved therein spirit soluble dyes.

U.S. Pat. No. 5,006,170 (Schwarz) and U.S. Pat. No. 5,122,187 (Marchessault et al.), the disclosures of each of which are totally incorporated herein by reference, disclose hot melt ink compositions suitable for ink jet printing which comprise a colorant, a binder, and a propellant selected from the group consisting of hydrazine; cyclic amines; ureas; carboxylic acids; sulfonic acids; aldehydes; ketones; hydrocarbons; esters; phenols; amides; iraides; halocarbons; urethanes; ethers; sulfones; sulfamides; sulfonamides; phosphites; phosphonates; phosphates; alkyl sulfides; alkyl acetates; and sulfur dioxide. Also disclosed are hot melt ink compositions suitable for ink jet printing which comprise a colorant, a propellant, and a binder selected from the group consisting of rosin esters; polyamides; dimer acid amides; fatty acid amides; epoxy resins; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides; benzoate esters; long chain alcohols; phthalate plasticizers; citrate plasticizers; maleate plasticizers; sulfones; polyvinyl pyrrolidinone copolymers; polyvinyl pyrrolidone/polyvinyl acetate copolymers; novalac resins; natural product waxes; mixtures of linear primary alcohols and linear long chain amides; and mixtures of linear primary alcohols and fatty acid amides. In one embodiment, the binder comprises a liquid crystalline material.

U.S. Pat. No. 5,021,802 (Allred), the disclosure of which is totally incorporated herein by reference, discloses a bubble jet ink which comprises 90 to 99.9 percent by weight of aqueous sol-gel medium and 0.1 to 1 percent by weight colorant. The inks are thermally reversible sol-gels which are gels at ambient temperatures and form liquid sols at temperatures between about 40° and 100° C.

U.S. Pat. No. 5,041,161 (Cooke et al.), the disclosure of which is totally incorporated herein by reference, discloses an ink jet ink which is semi-solid at room temperature. The ink combines the advantageous properties of thermal phase change inks and liquid inks. The inks comprise vehicles, such as glyceryl esters, polyoxyethylene esters, waxes, fatty acids, and mixtures thereof, which are semi-solid at temperatures between 20° and 45° C. The ink is impulse jetted at an elevated temperature in the range of above 45° C. to about 110° C., at which temperature the ink has a viscosity of about 10 to 15 centipoise. The inks also contain 0.1 to 30 weight percent of a colorant system.

U.S. Pat. Nos. 4,853,036 and 5,124,718 disclose an ink for ink jet recording which comprises a liquid composition essentially comprising a coloring matter, a volatile solvent having a vapor pressure of 1 mm Hg or more at 25° C., and a material being solid at room temperature and having a molecular weight of 300 or more, and prepared so as to satisfy the formula $B_1/A_1 \geq 3$, assuming viscosity as A1 cP at 25° C., measured when the content of the solid material in the composition is 10 percent by weight, and assuming viscosity as $B_1$ cP at 25° C., measured when the content of the solid material in the composition is 30 percent by weight. An ink jet recording process using the ink is also disclosed.

U.S. Pat. No. 5,065,167 (You et al.), the disclosure of which is totally incorporated herein by reference, discloses an ink jet ink including a waxy carrier that is solid at 25° C. and liquid at the operating temperature of an ink jet nozzle and a driver having a critical pressure greater than 10 atmospheres, the carrier and driver being miscible in liquid phase.

U.S. Pat. No. 5,047,084 (Miller et al.), the disclosure of which is totally incorporated herein by reference, discloses an ink jet ink in the form of a microemulsion of an organic vehicle phase comprising fatty acid and colorant dispersed therein and an aqueous phase containing a surfactant, the vehicle phase preferably being liquid at 70° C. and solid at 20° C.

U.S. Pat. No. 5,226,957 (Wickramanayake et al.), the disclosure of which is totally incorporated herein by reference, discloses water insoluble dyes formulated in a microemulsion-based ink which is waterfast, non-threading, and bleed-alleviated. The inks comprise (a) about 0.05 to 0.75 weight percent of a high molecular weight colloid, (b) about 0.1 to 40 weight percent of at least two surfactants, comprising at least one surfactant and at least one co-surfactant, (c) about 0.5 to 20 weight percent of at least one cosolvent, (d) about 0.1 to 5 weight percent of at least one water insoluble dye, (e) about 0.1 to 20 weight percent of an oil, and (f) the balance water. The ink forms a stable microemulsion.

"Stabilization of Inverse Micelles by Nonionic Surfactants," Stig E. Friberg, contained in *Interfacial Phenomena in Apolar Media,* Eicke & Parfitt, eds., Marcel Dekker Inc. (New York and Basel 1987), the disclosure of which is totally incorporated herein by reference, discloses and describes systems with hydrocarbon, water, and nonionic polyalkylene glycol alkyl ether surfactants which display pronounced variation of their phase patterns with temperature. At particular temperatures and component concentrations, a lamellar liquid crystalline phase is observed.

"A Hot Melt Ink for Thermal Jet Printing," A. H. Sporer et al., Journal of Imaging Science and Technology, Vol. 36, No. 2, p. 176 (March/April 1992), the disclosure of which is totally incorporated herein by reference, discloses an ink technology wherein the fluid vehicle of the ink is a stable, single-phase, water-in-oil (wax) microemulsion at elevated temperatures in the range of 70° to 95° C., yet is a solid at ambient temperatures. The ink, because it is a microemulsion, is stable to freeze-melt cycles. The ink is suitable for jetting as a hot melt ink in conventional continuous or impulse ink jet apparatus, and can also operate in impulse thermal ink jet printheads where other hot melt ink jet ink compositions cannot.

Copending Application entitled "Coated Recording Sheets," with the named inventor William M. Schwarz, the disclosure of which is totally incorporated herein by reference, discloses a recording sheet which comprises a substrate and a coating thereon comprising water and a surfactant capable of exhibiting a liquid crystalline phase in water at a temperature of about 25° C. or higher, said coating containing the water and surfactant in relative concentrations such that upon addition of water to the coating, the surfactant undergoes a phase change, thereby increasing the viscosity of the coating. In one embodiment, the surfactant is in a lamellar liquid crystalline phase and, upon addition of water to the coating, the surfactant undergoes a phase change to a hexagonal liquid crystalline phase. Also disclosed are ink jet printing processes wherein an aqueous ink is applied to the aforementioned recording sheet.

While known compositions and processes are suitable for their intended purposes, a need remains for ink compositions suitable for thermal ink jet printing. In addition, there is a need for ink compositions which are compatible with a wide variety of plain papers. Further, a need exists for ink compositions compatible with a wide variety of plain papers without the need for special ink drying hardware in the printing apparatus. Additionally, there is a need for ink compositions which generate high quality, waterfast images on plain papers. There is also a need for thermal ink jet ink compositions which generate high quality, fast-drying images on a wide variety of plain papers at low cost, with high quality text, high quality graphics, minimal feathering, minimal intercolor bleed, and excellent image permance. Further, there is a need for thermal ink jet ink compositions which can be employed without the need for very high printhead temperatures.

SUMMARY OF THE INVENTION

It is an object of the present invention to provide an ink composition with the above noted advantages.

It is another object of the present invention to provide ink compositions suitable for thermal ink jet printing.

It is yet another object of the present invention to provide ink compositions which are compatible with a wide variety of plain papers.

It is still another object of the present invention to provide ink compositions compatible with a wide variety of plain papers without the need for special ink drying hardware in the printing apparatus.

Another object of the present invention is to provide ink compositions which generate high quality, waterfast images on plain papers.

Yet another object of the present invention is to provide thermal ink jet ink compositions which generate high quality, fast-drying images on a wide variety of plain papers at low cost, with high quality text, high quality graphics, minimal leathering, minimal intercolor bleed, and excellent image permance.

Still another object of the present invention is to provide thermal ink jet ink compositions which can be employed without the need for very high printhead temperatures.

These and other objects of the present invention (or specific embodiments thereof) can be achieved by providing an ink composition which comprises an aqueous phase, an oil phase, an oil-soluble dye, and a surfactant, said ink exhibiting a liquid crystalline gel phase at a first temperature and a liquid microemulsion phase at a second temperature higher than the first temperature.

BRIEF DESCRIPTION OF THE DRAWINGS

Illustrated schematically in FIGS. 1 and 3 are partial phase diagrams at 25° C. for mixtures of water, polyoxyethylene (10) stearyl ether, and a ketone mixture comprising 50 percent by weight methyl ethyl ketone and 50 percent by weight 2,4-pentanedione.

Illustrated schematically in FIG. 2 is a partial phase diagram at 50° C. for mixtures of water, polyoxyethylene (10) stearyl ether, and a ketone mixture comprising 50 percent by weight methyl ethyl ketone and 50 percent by weight 2,4-pentanedione.

DETAILED DESCRIPTION OF THE INVENTION

The ink compositions of the present invention comprise an aqueous phase, an oil phase, an oil-soluble dye, and a surfactant. Water is present in the ink in any effective amount to enable formation of an emulsion, preferably an oil-in-water emulsion, and to enable bubble formation in a thermal ink jet printing process. Typically, water is present in the ink in an amount of from about 10 to about 50 percent by weight, although the amount can be outside this range.

The inks of the present invention also contain an oil phase or organic component which is immiscible with water. The organic component can be either a single organic compound or a mixture of two or more organic compounds which are mutually miscible wherein the mixture forms a distinct phase in water. The organic component is one in which an oil soluble dye can be dissolved or dispersed, and is one which is capable of forming an emulsion in water, preferably an oil-in-water emulsion. Provided that these conditions are met, the organic component can be selected so that the resulting ink exhibits the desired viscosity and surface tension properties which are most compatible with the operability of the particular printhead to be used and the particular substrate onto which the ink will be jetted. Examples of suitable materials for the organic phase include various mixtures of ketones, alcohols, glycol ethers, and hydrocarbons. Specific examples include methyl ethyl ketone, 2,4-pentadione, ethylene glycol dimethyl ether, ethanol, hexane, and the like. While solvents with boiling points of less than about 80° C. are suitable, solvents which boil at higher temperatures are also suitable, including those with boiling points of over 80° C., and those with boiling points of over 100° C., such as sulfolane, cyclohexanone, 2-pentanol, and the like. The organic component is present in the ink in any effective amount to enable formation of an emulsion with a dye contained in the oil phase. Typically, the organic component is present in the ink in an amount of from about 15 to about 50 percent by weight, preferably from about 17 to about 44 percent by weight, although the amount can be outside these ranges.

Inks of the present invention also contain an oil soluble dye. The dye is selected so that it is relatively soluble in the organic component of the ink and relatively insoluble in water. For example, one dye suitable for the present invention, Solvent Red 119, has solubilities of about 0.35 grams per milliliter in benzyl alcohol, about 0.2 grams per milliliter in methyl ethyl ketone, about 3 milligrams per milliliter in ethanol, and less than about 0.1 milligram per milliliter in water. Another suitable dye, Solvent Blue 37, is somewhat more soluble in water. The dye is present in the ink in any effective amount. Typically, the dye is present in the ink in an amount of from about 2 to about 10 percent by weight, preferably from about 2 to about 6 percent by weight, and more preferably from about 3 to about 4 percent by weight, although the amount can be outside these ranges. Examples of suitable oil soluble or spirit soluble dyes include Orasol Black RL or Intraplast Black RL/Solvent Black 29, Lapranol Black BR, Savinyl Black RLS, Orasol Black RLP, Neozapon Black X57; solvent yellow dyes inclusive of Savinyl Yellow 2 RLS, Savinyl Yellow RLSN, Intraplast Yellow 2GLN, Neozapon Yellow 081, Neozapon Yellow 141, Levaderm Lemon Yellow, Zapon Fast Yellow CGR, Aizen Fast Yellow CGNH, Zapon Yellow 100, Zapon Yellow 157, and Savinyl Yellow RLS; magenta dyes such as Neozapon Red 492, Direct Brilliant Pink B, Savinyl Pink 6 BLS, Savinyl Red 3 BLS, Orasol Red 2 BL, Intraplast Red G (Orasol Red), Savinyl Red BLSN, Savinyl Scarlet RLS, Savinyl Fire Red 3GLS, and Zapon Red 335; cyan dyes Orasol Blue 2 GLN, Neozapon Blue 807, Savinyl Blue RLS, Savinyl Blue GLS, Orasol Blue GN, and Losol Blue; brown dyes inclusive of Zapon Brown 187 and Savinyl Brown GLS, Solvent Green 3, Sudan Black B, Ceres Blue 2V, Liquid Oil Jet Black, Macrolex Red G Gram, Macrolex Yellow 3G, Morfast Blue 100, Morfast Red 104, and mixtures thereof; and the like, as well as mixtures thereof.

Ink compositions of the present invention also contain one or more surfactants capable of imparting to the mixture of water and oil phase a liquid crystalline microemulsion structure at a temperature suitable for ink jet printing. The surfactant or mixture of surfactants is present in any effective amount to enable formation of a liquid crystalline emulsion between the water and organic component in the ink. Typically, the surfactant or mixture of surfactants is present in the ink in an amount of from about 25 to about 65 percent by weight, preferably from about 27 to about 60 percent by weight, although the amount can be outside these ranges. Preferred surfactants generally are nonionic surfactants, which may also be combined with small amounts (i.e., typically less than about 10 percent) of ionic surfactants, although ionic surfactants can also be employed in the absence of nonionic surfactants. Examples of suitable surfactants include those based upon alkyl or alkylaryl groups as the hydrophobic units and alkylene oxide or alkylene glycol groups as the hydrophilic units. Examples include those of the general structural formula $C_xH_{(2x+a)}(OCH_2CH_2)_yA$, wherein x is an integer of from about 8 to about 22, preferably from about 12 to about 18, y is an integer of from 0 to about 14, preferably from about 2 to about 8, and A is a terminal functional group. Also suitable are surfactants of the general structural formula wherein R is hydrogen or an alkyl group (such as methyl, ethyl, propyl, butyl, or the like), x is an integer of from about 8 to about 22, preferably from about 12 to about 18, y is an integer of from 0 to about 14, preferably from about 2 to about 8, and A is a terminal functional group. Also suitable are surfactants of the general structural formula wherein x is an integer of from about 8 to about 22, preferably from about 12 to about 18, y is an integer of from 0 to about 14, preferably from about 2 to about 8, and A is a terminal functional group. Also suitable are surfactants of the general structural formula wherein R is hydrogen or an alkyl group (such as methyl, ethyl, propyl, butyl, or the like), x is an integer of from about 8 to about 22, preferably from about 12 to about 18, y is an integer of from 0 to about 14, preferably from about 2 to about 8, and A is a terminal functional group. Also suitable are surfactants of the general structural formula wherein x is an integer of from about 8 to about 22, preferably from about 12 to about 18, y is an integer of from 0 to about 14, preferably from about 2 to about 8, and A is a terminal functional group. Surfactants of this general formula are available from, for example, Union Carbide, Danbury, Conn. Also suitable are surfactants of the general formula wherein each R is, independently of the other, hydrogen or an alkyl group (such as methyl, ethyl, propyl, butyl, or the like), and x is an integer of from about 8 to about 22, preferably from about 12 to about 18. Surfactants of this general formula are generally available, for example, as the Ammonyx Series from Stepan Chemicals, Northfield, Ill. Also suitable are surfactants of the general formula wherein each R is, independently of the other, hydrogen or an alkyl group (such as methyl, ethyl, propyl, butyl, or the like), and x is an integer of from about 8 to about 22, preferably from about 12 to about 18. Also suitable are surfactants of the general formula wherein each R is, independently of the other, hydrogen or an alkyl group (such as methyl, ethyl, propyl, butyl, or the like), and x is an integer of from about 8 to about 22, preferably from about 12 to about 18. Also suitable are surfactants of the general formula wherein each R is, independently of the others, hydrogen or an alkyl group (such as methyl, ethyl, propyl, butyl, or the like), and x is an integer of from about 8 to about 22, preferably from about 12 to about 18. Also suitable are surfactants of the general formula wherein each R is, independently of the others, hydrogen or an alkyl group (such as methyl, ethyl, propyl, butyl, or the like), and x is an integer of from about 8 to about 22, preferably from about 12 to about 18.

Examples of suitable terminal functional groups "A" include —H, —OH, —CH3, —C$_2$H$_5$, —CH$_2$CH$_2$CH$_3$, —CH(CH$_3$)$_2$, —OSO$_3^-$, —OSO$_2$NR$_2$ wherein each R is, independently of the others, hydrogen or an alkyl group (such as methyl, ethyl, propyl, butyl, or the like), —COO$^-$, —OPO$_3^-$, —C(O)OCH$_2$CH$_2$SO$_3^-$, —NR$_3$+ wherein each R is, independently of the others, hydrogen or an alkyl group (such as methyl, ethyl, propyl, butyl, or the like), —N(R)CH$_2$COO$^-$ wherein R is hydrogen or an alkyl group (such as methyl, ethyl, propyl, butyl, or the like), —N$^+$R$_2$CH$_2$COO$^-$ wherein each R is, independently of the other, hydrogen or an alkyl group (such as methyl, ethyl, propyl, butyl, or the like), —N(R)CH$_2$CH$_2$COO$^-$ wherein R is hydrogen or an alkyl group (such as methyl, ethyl, propyl, butyl, or the like), —N$^+$R$_2$CH$_2$CH$_2$COO$^-$ wherein each R is, independently of the other, hydrogen or an alkyl group (such as methyl, ethyl, propyl, butyl, or the like), —N(R)CH$_2$SO$_3^-$ wherein R is hydrogen or an alkyl group (such as methyl, ethyl, propyl, butyl, or the like), —N$^+$R$_2$CH$_2$SO$_3^-$ wherein each R is, independently of the other, hydrogen or an alkyl group (such as methyl, ethyl, propyl, butyl, or the like), —N(R)CH$_2$CH$_2$SO$_3^-$ wherein R is hydrogen or an alkyl group (such as methyl, ethyl, propyl, butyl, or the like), —N$^+$R$_2$CH$_2$CH$_2$SO$_3^-$ wherein each R is, independently of the other, hydrogen or an alkyl group (such as methyl, ethyl, propyl, butyl, or the like), —C(O)N(R)CH$_2$COO$^-$ wherein R is hydrogen or an alkyl group (such as methyl, ethyl, propyl, butyl, or the like), —C(O)N(R)CH$_2$CH$_2$COO$^-$ wherein R is hydrogen or an alkyl group (such as methyl, ethyl, propyl, butyl, or the like), —C(O)N(R)CH$_2$SO$_3^-$ wherein R is hydrogen or an alkyl group (such as methyl, ethyl, propyl, butyl, or the like), —C(O)N(R)CH$_2$CH$_2$SO$_3^-$ wherein R is hydrogen or an alkyl group (such as methyl, ethyl, propyl, butyl, or the like), or any other suitable terminal functional group. Specific examples of suitable surfactants include ammonium laureth sulfate, commercially available as Steol CA 460 from Stepan Chemicals, Northfield, Ill., the Genapol® series of surfactants available from Hoechst Celanese Corp., Charlotte, N.C., including the 26-L series and the 24-L series, of the general formula RO(CH$_2$CH$_2$O)$_n$H wherein R is a mixture of linear, even carbon-number hydrocarbon chains ranging from C$_{12}$H$_{25}$ to C$_{16}$H$_{33}$ and n represents the number of repeating units and is a number of from 1 to about 12, such as 26-L- 1,26-L- 1.6, 26-L-2, 26-L-3, 26-U5, 26-L-45, 26-L-50, 26- L-60, 26-L-60N, 26-L-75, 26-L-98N, 24-L-3, where R is a mixture of C$_{12}$H$_{25}$ and C$_{14}$H$_{29}$ and n has an average value of about 3, 24-L-45, where R is a mixture of C$_{12}$H$_{25}$ and C$_{14}$H$_{29}$ and n has an average value of about 6.3, 24-L-50, where R is a mixture of C$_{12}$H$_{25}$ and C$_{14}$H$_{29}$ and n has an average value of about 6.9, 24-L-60, where R is a mixture of C$_{12}$H$_{25}$ and C$_{14}$H$_{29}$ and n has an average value of about 7.2, 24-L-60N, where R is a mixture of C$_{12}$H$_{25}$ and C$_{14}$H$_{29}$ and n has an average value of about 7.0, 24-L-75, where R is a mixture of C$_{12}$H$_{25}$ and C$_{14}$H$_{29}$ and n has an average value of about 8.3, 24- L-92, and 24-L-98N, where R is a mixture of C$_{12}$H$_{25}$ and C14H29 and n has an average value of about 11.3, polyoxyethylene (10) stearyl ether surfactant (Brij 76, available from ICI Americas, Inc., Wilmington, Del.), Brij 56 polyoxyethylene (10) cetyl ether surfactant (available from ICI Americas, Inc., Wilmington, Del.), Brij 78 polyoxyethylene (20) stearyl ether surfactant (available from ICI Americas, Wilmington, Del.), sodium dioctyl sulfosuccinate surfactant (available as Aerosil TO from American Cyanamid, Wayne, N.J.), sodium dodecyl sulfonate surfactant (available from E.I. Du Pont de Nemours & Co., Wilmington, Del.), cetyl trimethyl ammonium bromide surfactant, and the like, as well as mixtures thereof.

Other optional additives to the inks include biocides such as Dowicil 150, 200, and 75, benzoate salts, sorbate salts, and the like, present in an amount of from about 0.0001 to about 4 percent by weight, and preferably from about 0.01 to about 2.0 percent by weight, pH controlling agents such as acids or, bases, phosphate salts, carboxylates salts, sulfite salts, amine salts, and the like, present in an amount of from 0 to about 1 percent by weight and preferably from about 0.01 to about 1 percent by weight, or the like.

The inks of the present invention are characterized by their ability to exhibit a liquid crystalline gel structure at certain temperatures and a liquid microemulsion structure at other, higher temperatures. At a first temperature, they exist in a solid-like form as liquid crystalline gels. At a second temperature, higher than the first temperature, they exist as relatively viscous liquid sols. At a third temperature, higher than the second temperature, they exist as pure liquid microemulsions. In each instance, the transition from one phase to another upon heating or cooling is relatively sharp, in that it occurs rapidly within a narrow temperature range. The inks pass reversibly through these phase changes. Thus, for an ink existing in the liquid crystalline gel form at about 25° C., in the liquid sol form at about 40° C., and in the pure liquid microemulsion form at about 60° C., the ink in gel form can be heated to a suitable temperature, for example, about 60° or 70° C., in an apparatus suitable for hot melt ink jet printing. The ink is jetted onto the substrate, and, as it cools, it passes through the liquid sol phase and into the gel phase. Thus, because the ink rapidly becomes more viscous during cooling, capillary action of the ink in the paper is retarded and high definition images are formed even on plain paper. Optical or scanning electron microscopic examination of an image edge made with inks of the present invention reveals negligible feathering of the immobilized liquid crystalline ink phase. In contrast to other phase change ink concepts, the inks of the present invention upon jetting momentarily remain sufficiently fluid to be partially absorbed into the paper. As a result, the images dry rapidly, show no raised braille-like character, are resistant to surface abrasion, and exhibit good fix. Inks which exist in the liquid sol phase at room temperature and in the pure liquid microemulsion phase at a temperature above room temperature are also suitable for the process of the present invention.

Figure 1:
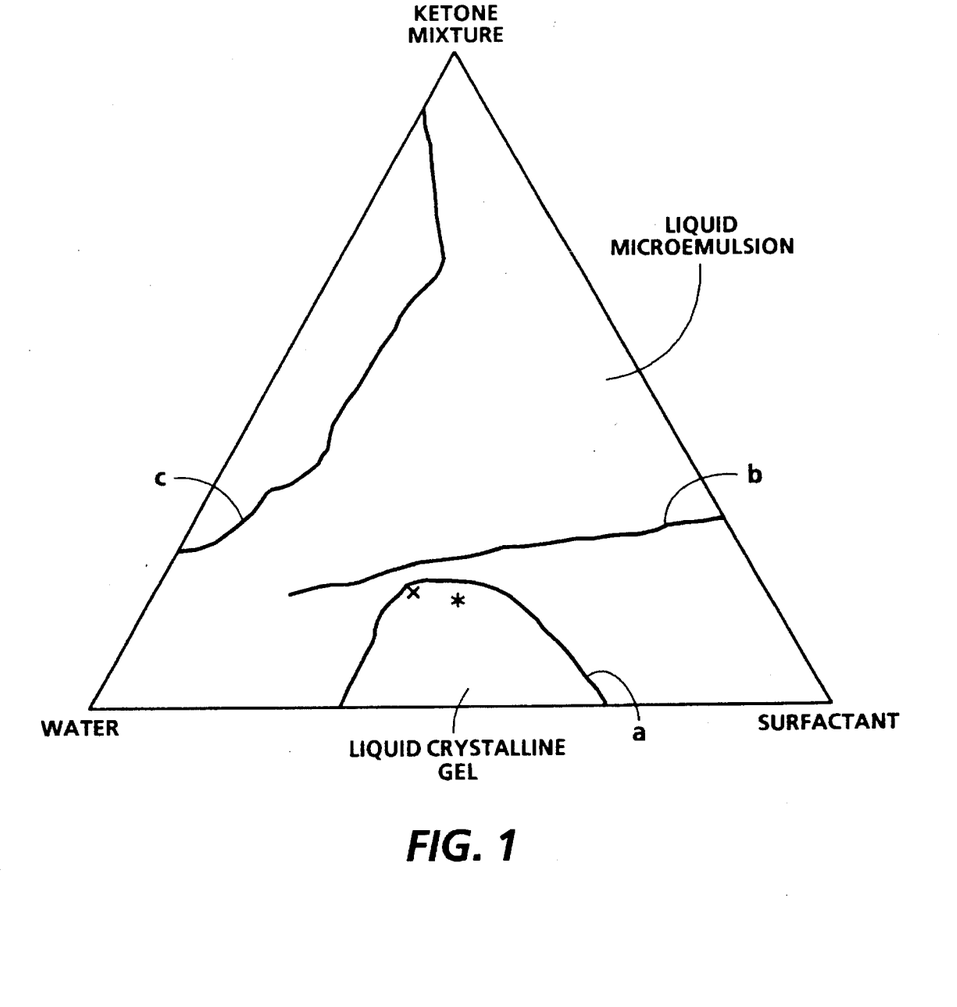
Figure 2:
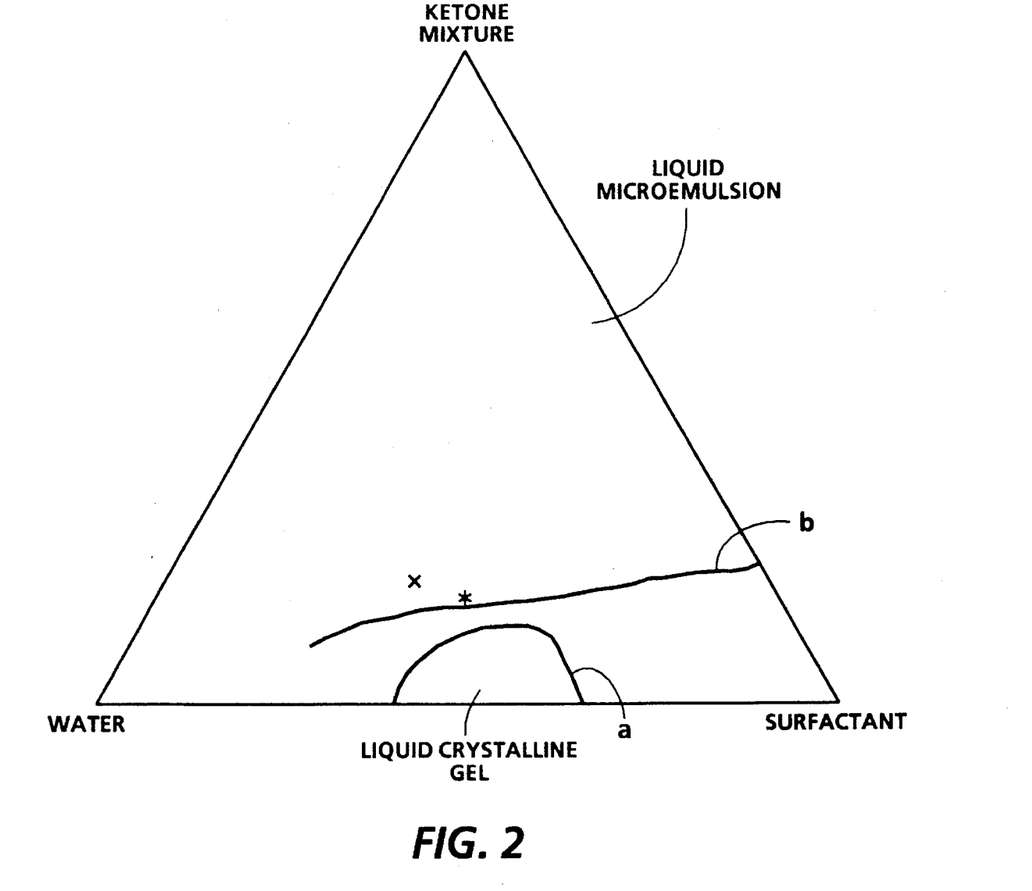

The behavior of ink compositions of the present invention is further illustrated by the partial phase diagrams in FIGS. 1 and 2. More specifically, inks 1 and 2 prepared in Example I hereinbelow can be represented by the partial phase diagrams shown in FIGS. 1 and 2, wherein ink 1 is represented by an "X" and ink 2 is represented by a "*" Illustrated in FIG. 1 is a partial phase diagram for a mixture of water, surfactant, and a ketone mixture at 25° C. Illustrated in FIG.

2 is a partial phase diagram for the same mixture of water, surfactant, and ketone mixture at 50° C. In both instances, each apex of the triangle represents one of the three components at a concentration of 100% by weight, and the point where a line drawn from each apex to the triangle base opposite the apex intersects the base represents that component at a concentration of 0% by weight. (Thus, a mixture containing 33.3% by weight of each component would be plotted at the exact point where all three lines intersect in the center of the triangle.) The composition can be shifted between the liquid crystalline gel phase, represented by the area under line "a" in the diagrams, the pure liquid microemulsion phase, represented by the area above line "b" in the diagrams, and the transitionary liquid sol phase, represented by the area between lines "a" and "b" on the diagrams, by varying the relative concentrations of each of the three components at the temperature of the diagram. The phase of a particular composition can also be shifted by varying the temperature, as can be seen by the differences between the phase lines on the diagram in FIG. 1, at 25° C., and FIG. 2, at 50° C. Thus, as shown, inks 1 and 2 are in the liquid crystalline gel phase at 25° C., but shift to the liquid microemulsion phase at 50° C. These diagrams are referred to herein as "partial" in that not all possible phases at all possible concentrations have been mapped. The area above line "c" in FIG. 1 is a two-phase mixture of water and organic ketone, and other areas on the diagrams are generally believed to be single phase mixtures. These phase diagrams are known in the art and are demonstrated in more detail in, for example, "Stabilization of Inverse Micelies by Nonionic Surfactants," Stig E. Friberg, contained in *Interfacial Phenomena in Apolar Media,* Eicke & Parfitt, eds., Marcel Dekker Inc. (New York and Basel 1987), the disclosure of which is totally incorporated herein by reference.

Figure 3:
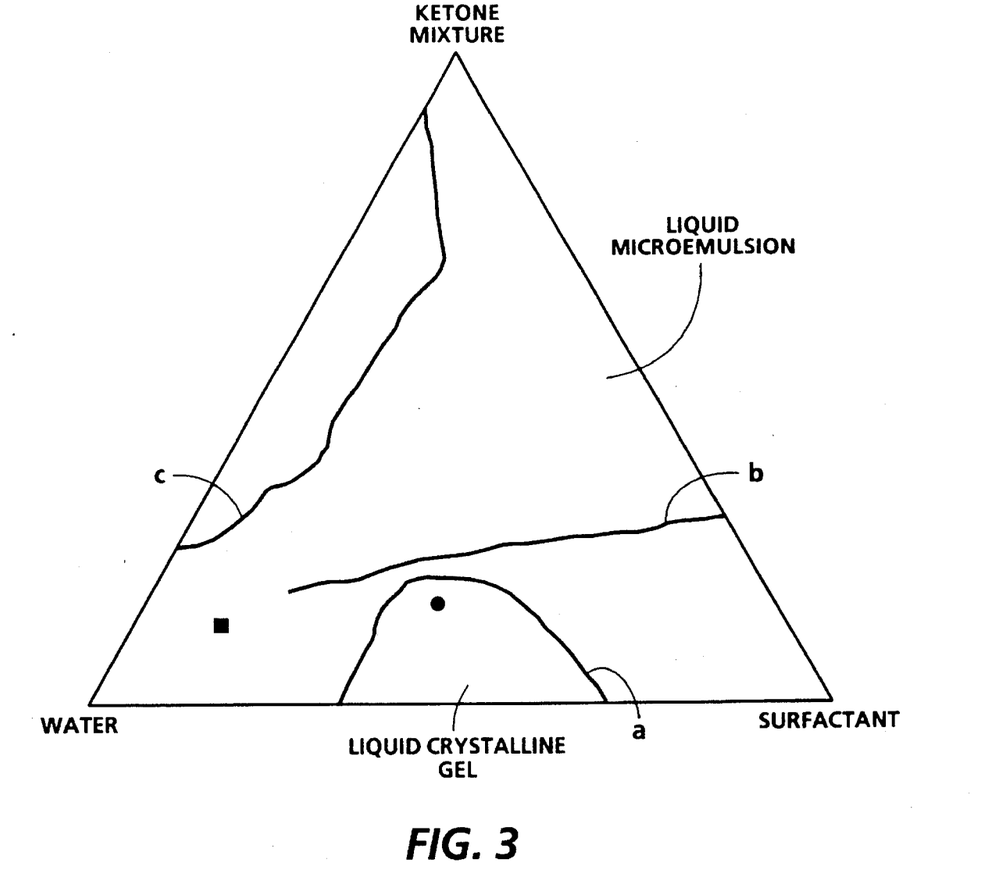

Also suitable for the present invention are inks which are formulated and jetted in an ink jet printing process in a relatively "dilute" form, in that they contain a relatively high concentration of water. These inks, however, are of a formulation that enables formation of a liquid crystalline gel when the ink becomes more concentrated subsequent to jetting onto a substrate and evaporation of water therefrom. An example of such an ink is illustrated schematically in FIG. 3, which represents the same component mixture illustrated in FIGS. 1 and 2, and with the same phases at 25° C., wherein a square represents the composition of an ink prior to jetting at 25° C. and a circle represents the composition of the ink subsequent to partial drying of the ink on the substrate at 25° C. These "dilute" inks are particularly suitable for printing processes wherein the substrate, such as paper, transparency material, or the like, is heated during the printing process to facilitate evaporation of water from the ink and concentration of the liquid crystalline sol component. Preferably, the substrate is heated to the highest temperature possible to enable the most rapid possible ink drying without damaging the substrate. When transparency substrates are employed, temperatures typically are limited to a maximum of about 100° to 110° C., since the polyester typically employed as the base sheet in transparency sheets tends to deform at higher temperatures. Specially formulated transparencies and paper substrates can, however, tolerate higher temperatures, frequently being suitable for exposure to temperatures of 150° or even 200° C. in some instances. Typical heating temperatures are from about 90° to about 140° C. These inks can, however, also be employed in a printing process wherein the substrate is not heated and the ink is allowed to dry at ambient temperature; in these instances, drying times of from about 10 to about 15 seconds are typical, although the drying time can be outside this range.

Inks of the present invention are distinct from inks which contain liquid crystalline molecules or components in that no single ink component, standing alone, exhibits liquid crystalline behavior. Rather, the combination of ink components exhibits liquid crystalline behavior upon heating and cooling.

Inks of the present invention which are solid at room temperature typically exist within a specific temperature window in the solid or liquid crystalline gel phase at temperatures of from about 10° to about 45° C., preferably from about 25° to about 40° C., although the range of gel temperatures can be outside these ranges. Inks of the present invention typically exist in the liquid sol phase at temperatures of from about 15° to about 70° C., preferably from about 25° to about 65° C., although the range of liquid sol temperatures can be outside these ranges. Inks of the present invention typically exist in the pure liquid microemulsion phase at temperatures of above about 65, preferably above about 75° C, although the pure liquid microemulsion temperature can be above or below these values.

While in the liquid crystalline gel form, inks of the present invention typically have viscosities of several hundred milliPascal-seconds or more. While at higher temperatures (typically about 60° C. or more) in the liquid sol form, inks of the present invention typically have viscosities of from about 5 to about 12 milliPascal-seconds, although the viscosity in the liquid sol form can be outside this range. While in the pure liquid microemulsion form, inks of the present invention typically have viscosities that are somewhat lower than the viscosity of the ink in the liquid sol form, typically being at least about 20 percent lower than the viscosity of the ink in the liquid sol form, and typically being from about 2 to about 10 milliPascal-seconds, although the viscosity in the microemulsion form can be outside this range.

Typically, inks of the present invention are converted from the liquid crystalline gel phase to the liquid sol phase over a relatively narrow temperature range; typically the temperature range for the transition between the liquid crystalline gel phase and the liquid sol phase is about 2° C. or less, more typically about 1° C. or less, and preferably about 0.5° C or less, although the transition range can be broader than these ranges. Typically, inks of the present invention are converted from the liquid sol phase to the pure liquid microemulsion phase over a relatively narrow temperature range; typically the temperature range for the transition between the liquid sol phase and the pure liquid microemulsion phase is about 2° C. or less, more typically about 1° C. or less, and preferably about 0.5° C. or less, although the transition range can be broader than these ranges.

Inks of the present invention can be prepared by any suitable method. For example, the inks can be prepared by gently stirring or shaking the individual components of the aqueous, surfactant, and organic solvent phases in an appropriate container. Typically, the dye is admixed with the organic component first (and, if necessary, filtering this mixture to remove any solid impurities), followed by admixing all of the other ingredients with the organic component/dye mixture, agitating while heating to a temperature adequate to form a stable microemulsion, and thereafter cooling the ink.

Printed images may be generated with the inks of the present invention by incorporating the inks into a thermal ink jet printer and causing droplets of the molten ink to be ejected in imagewise pattern onto a substrate such as paper or transparency material. Suitable printers for employing the inks of the present invention include commercially available ink jet printers, such as the ThinkJet®, PaintJet®, and DeskJet® printers available from Hewlett-Packard Company. Conventional thermal ink jet printers may be modified to make them suitable for use with inks of the present invention by including a heater for heating the ink reservoir to the temperature at or above which the ink is in the pure liquid microemulsion phase. The inks of the present invention are also suitable for use in piezoelectric drop-on-demand ink jet printing systems and in continuous stream ink jet printing systems that have been modified to be capable of heating the ink. Any suitable substrate can be employed, including plain papers such as Xerox® 4024 papers, ruled notebook paper, bond paper, silica coated papers such as Sharp Company silica coated paper, Jujo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Ink compositions of the present invention with the following ingredients (percentages are by weight) were prepared by first admixing the dye and the organic component and filtering the mixture, followed by admixing the remaining ingredients, heating to a temperature sufficient to establish a stable microemulsion, and shaking, followed by cooling:

Ink 1:
  2.0% Keyfast Blue dye (Solvent Blue 37, obtained from Keystone Aniline Corp., Chicago, Ill.), 33.3% polyoxyethylene (10) stearyl ether surfactant (Brij 76, obtained from ICI Americas, Inc., Wilmington, Del.), 48.0% water, 16.7% mixture containing 50% methyl ethyl ketone and 50% 2,4-pentanedione.

Ink 2:
  2.0% Keyfast Blue dye (Solvent Blue 37), 40.7% Brij 76 surfactant, 40.7% water, 16.6% mixture containing 50% methyl ethyl ketone and 50% 2,4-pentanedione.

Ink 3:
  2.0% Ceres Blue dye (Solvent Blue 58, obtained from Keystone Aniline Corp., Chicago, Ill.), 57.8% sodium dioctyl sulfosuccinate (aerosol) surfactant (obtained from American Cyanamid, Wayne, N.J.), 10.8% water, 29.4% methyl ethyl ketone.

Ink 4:
  1.5% Liquid Oil Black Dye (obtained from Keystone Aniline Corp., Chicago, Ill.), 54.1% sodium dioctyl sulfosuccinate (aerosol) surfactant, 14.8% water, 29.6% methyl ethyl ketone.

Ink 5:
  6.0% Ceres Blue dye (Solvent Blue 58), 27.8% Brij 76 surfactant, 22.6% water, 17.3% methyl ethyl ketone, 7.5% ethanol, 18.8% hexane.

Ink 6:
  1.5% Keyfast Black LB dye (Solvent Black 47, obtained from Keystone Aniline Corp., Chicago, Ill.), 5.5% Oil Jet black dye (obtained from Keystone Aniline Corp., Chicago, Ill.), 27.5% Brij 56 polyoxyethylene (10) cetyl ether surfactant (obtained from ICI Americas, Inc., Wilmington, Del.), 22.4% water, 16.8% methyl ethyl ketone, 7.7% ethanol, 18.6% hexane.

These inks exhibited the following characteristics:

| Ink | gel phase (°C.) | liquid sol phase (°C.) | liquid micro- emulsion phase (°C.) | Viscosity (MPa · s) @ 60° C. | Surface Tension (mN/m) |
|---|---|---|---|---|---|
| 1 | 25–40 | 40–65 | >65 | 10.2 | 28 |
| 2 | 25–40 | 40–70 | >70 | 12.0 | 28 |
| 3 | <25 | <25–70 | >70 | 6.4 | 27 |
| 4 | <25 | <25–70 | >70 | 5.1 | 28 |
| 5 | <25 | <25–70 | >70 | not measured | not measured |
| 6 | <25 | <25–70 | >70 | not measured | not measured |

These inks were each incorporated into a thermal ink jet printing test fixture equipped with a Hewlett-Packard DeskJet® printhead modified with an aluminum block heater inserted into the cartridge. The printhead cartridge was heated to temperatures of from about 90° to about 110° C. to result in printhead face temperatures of from about 65° to about 85° C. to enable drop ejection. Images were generated by jetting the inks onto Xerox® Archival bond (25% cotton) plain paper. All of the inks were capable of being jetted at these temperatures. While all inks jetted sporadically, giving incomplete images of lines, text, and solids, this result is also observed in this fixture for other hot melt inks studied, for example, by Sporer et al. (*Journal of Imaging Science and Technology*, vol. 36, p. 176 (1992), the disclosure of which is totally incorporated herein by reference), and is attributed to the fixed pulse frequency of the Hewlett-Packard printhead, which is not in synchronism with the time dependent refill characteristics of the inks, which are primarily dictated by their rheological properties. Despite incomplete imaging, it was possible to ascertain by optical microscopy and scanning electron microscopy that inks 1 through 4 produced images with negligible feathering, indicating rapid and effective "viscosity switching" upon contact with paper.

EXAMPLE II

Ink compositions of the present invention with the following ingredients (percentages are by weight) were prepared by admixing the following ingredients at 75° C. with stirring to dissolve the surfactant in the other ingredients and form a liquid microemulsion, followed by cooling to room temperature to obtain a liquid crystalline gel:

Ink 7:
  30% polyoxyethylene (20) stearyl ether surfactant (Brij 78, obtained from ICI Americas, Inc., Wilmington, Del.), 60% water, 10% mixture containing 97% water and 3% Neozapon Blue 807 dye (obtained from BASF).

Ink 8:
  30% polyoxyethylene (20) stearyl ether surfactant (Brij 78, obtained from ICI Americas, Inc., Wilmington, Del.), 50% water, 20% mixture containing 97% water and 3% Sudan Red 460 dye (obtained from BASF).

The ink compositions thus prepared can be incorporated into a thermal ink jet printing test fixture as described in Example ]: and employed to generate images on plain paper.

EXAMPLE III

Ink compositions of the present invention with the following ingredients (percentages are by weight) were prepared by first admixing the dye and the organic component and filtering the mixture, followed by admixing the remaining ingredients, heating to a temperature sufficient to establish a stable microemulsion, and shaking, followed by cooling:

Ink 9:
  4.1% Keyfast Red dye (Solvent Red 119, obtained from Keystone Aniline Corp., Chicago, Ill.), 6.3% sodium dioctyl sulfosuccinate surfactant (Aerosil TO, obtained from American Cyanamid Co., Wayne, N.J.), 29.0% water, 60.6% cyclohexanone.

Ink 10:
  4.1% Keyfast Red dye (Solvent Red 119, obtained from Keystone Aniline Corp., Chicago, Ill.), 6.9% sodium dodecyl sulfonate surfactant (obtained from E.I. Du Pont de Nemours & Co., Wilmington, Del.), 30.0% water, 59.0% cyclohexanone.

Ink 11:
  3.5% Keyfast Blue dye (Solvent Blue 37, obtained from Keystone Aniline Corp., Chicago, Ill.), 4.5% sodium dioctyl sulfosuccinate surfactant (Aerosil TO, obtained from American Cyanamid Co., Wayne, N.J.), 31.5% water, 52.6% cyclohexanone, 7.9% ethanol.

Ink 12:
  3.5% Keyfast Red dye (Solvent Red 119, obtained from Keystone Aniline Corp., Chicago, Ill.), 3.9% sodium dodecyl sulfonate surfactant (obtained from E.I. Du Pont de Nemours & Co., Wilmington, Del.), 30.6% water, 45.0% cyclohexanone, 11.6% methyl cellosolve.

Ink 13:
  3.4% Keyfast Blue dye (Solvent Blue 37, obtained from Keystone Aniline Corp., Chicago, Ill.), 5.6% sodium dodecyl sulfonate surfactant (obtained from E.I. Du Pont de Nemours & Co., Wilmington, Del.), 30.0% water, 51.5% cyclohexanone, 2.1% ethanol, 5.3% ethylene glycol.

Ink 14:
  3.8% Keyfast Red dye (Solvent Red 119, obtained from Keystone Aniline Corp., Chicago, Ill.), 5.0% cetyl trimethyl ammonium bromide surfactant, 29.1% water, 51.5% cyclohexanone, 6.0% ethanol, 4.6% methyl cellosolve.

These inks exhibited the following characteristics:

| Ink | Viscosity (MPa · s) @ 25° C. | Surface Tension (mN/m) |
| --- | --- | --- |
| 9 | 5.45 | 29.9 |
| 10 | 4.83 | 30.9 |
| 11 | 3.39 | 30.7 |
| 12 | 4.21 | 31.8 |
| 13 | 4.73 | 32.7 |
| 14 | 3.39 | 31.9 |

The inks thus formed contained a relatively small concentration of liquid crystalline phase prior to jetting; this phase, however, becomes concentrated upon evaporation of water from the ink subsequent to jetting.

These inks were incorporated into a thermal ink jet printing test fixture equipped with a Hewlett-Packard DeskJet® printhead. Images were generated by jetting the inks onto a variety of plain papers. All of the inks exhibited good printhead operability, being readily jettable with little or no maintenance intervention.

Optionally, the paper can be heated to a temperature of about 100° C. by a heating block situated under the paper sheet to increase drying time and concentration of the liquid crystalline phase in the ink subsequent to jetting.

Other embodiments and modifications of the present invention may occur to those skilled in the art subsequent to a review of the information presented herein, these embodiments and modifications, as well as equivalents thereof, are also included within the scope of this invention.

What is claimed is:

1. An ink composition which comprises an aqueous phase, an oil phase, an oil-soluble dye, and a surfactant, said ink exhibiting a liquid crystalline gel phase at a first temperature and a liquid microemulsion phase at a second temperature higher than the first temperature.

2. An ink composition according to claim 1 wherein the oil phase is selected from the group consisting of ketones, alcohols, glycol ethers, hydrocarbons, and mixtures thereof.

3. An ink composition according to claim 1 wherein the oil phase contains a material selected from the group consisting of methyl ethyl ketone, 2,4-pentadione, ethylene glycol dimethyl ether, ethanol, hexane, and mixtures thereof.

4. An ink composition according to claim 1 wherein the oil phase contains materials with boiling points of less than about 80° C.

5. An ink composition according to claim 1 wherein the oil phase contains a material selected from the group consisting of sulfolane, cyclohexanone, 2-pentanol, and mixtures thereof.

6. An ink composition according to claim 1 wherein the oil phase contains materials with boiling points of greater than about 80° C.

7. An ink composition according to claim 1 wherein the oil phase contains materials with boiling points of greater than about 100° C.

8. An ink composition according to claim 1 wherein the oil phase is present in the ink in an amount of from about 15 to about 50 percent by weight.

9. An ink composition according to claim 1 wherein the oil phase is present in the ink in an amount of from about 17 to about 44 percent by weight.

10. An ink composition according to claim 1 wherein the dye is present in the ink in an amount of from about 2 to about 10 percent by weight.

11. An ink composition according to claim 1 wherein the surfactant is present in the ink in an amount of from about 25 to about 65 percent by weight.

12. An ink composition according to claim 1 wherein the surfactant is present in the ink in an amount of from about 27 to about 60 percent by weight.

13. An ink composition according to claim 1 wherein the surfactant is a nonionic surfactant.

14. An ink composition according to claim 1 wherein the surfactant contains hydrophobic units selected from the group consisting of alkyl groups and alkylaryl groups and contains hydrophilic units selected from the group consisting of alkylene oxide groups and alkylene glycol groups.

15. An ink composition according to claim 1 wherein the surfactant is $C_xH_{(2x+1)}(OC_2H_4)_yA$, or wherein each R is, independently of the others, hydrogen or an alkyl group, x is an integer of from about 8 to about 22, y is an integer of from 0 to about 14, and A is a terminal functional group.

16. An ink composition according to claim 15 wherein x is an integer of from about 12 to about 18, y is an integer of from about 2 to about 8, and A is selected from the group consisting of —H, —OH, —CH$_3$, —C$_2$H$_5$, —CH$_2$CH$_2$CH$_3$, —CH(CH$_3$)$_2$, —OSO$_3$⁻, —OSO$_2$NR$_2$ wherein each R is, independently of the others, hydrogen or an alkyl group; —COO⁻, —OPO$_3$⁻, —C(O)OCH$_2$CH$_2$SO$_3$⁻, —NR$_3$+ wherein each R is, independently of the others, hydrogen or an alkyl group; —N(R)CH$_2$COO⁻ wherein R is hydrogen or an alkyl group; —N⁺R$_2$CH$_2$COO⁻ wherein each R is, independently of the other, hydrogen or an alkyl group; —N(R)CH$_2$CH$_2$COO⁻ wherein R is hydrogen or an alkyl group; —N⁺R$_2$CH$_2$CH$_2$COO⁻ wherein each R is, independently of the other, hydrogen or an alkyl group; —N(R)CH$_2$SO$_3$⁻ wherein R is hydrogen or an alkyl group; —N+R$_2$CH$_2$SO$_3$⁻ wherein each R is, independently of the other, hydrogen or an alkyl group; —N(R)CH$_2$CH$_2$SO$_3$⁻ wherein R is hydrogen or an alkyl group; —N$^{+R}$$_2$CH$_2$CH$_2$SO$_3$⁻ wherein each R is, independently of the other, hydrogen or an alkyl group; —C(O)N(R)CH$_2$COO⁻ wherein R is hydrogen or an alkyl group, —C(O)N(R)CH$_2$CH$_2$COO⁻ wherein R is hydrogen or an alkyl group; —C(O)N(R)CH$_2$SO$_3$⁻ wherein R is hydrogen or an alkyl group; —C(O)N(R)CH$_2$CH$_2$SO$_3$⁻ wherein R is hydrogen or an alkyl group;

and mixtures thereof.

17. An ink composition according to claim 1 wherein the surfactant is selected from the group consisting of those of the general formula RO(CH$_2$CH$_2$O)$_n$H wherein R is a mixture of linear, even carbon-number hydrocarbon chains ranging from C$_{12}$H$_{25}$ to C$_{16}$H$_{33}$ and n represents the number of repeating units and is a number of from 1 to about 12.

18. An ink composition according to claim 1 wherein the surfactant is selected from the group consisting of: (a) C$_{12}$H$_{25}$—(OCH$_2$CH$_2$)$_6$OH; (b) C$_{12}$H$_{25}$—(OCH$_2$CH$_2$)$_2$OSO$_3$⊖; (c) RO(CH$_2$CH$_2$O)$_n$H where R is a mixture of C$_{12}$H$_{25}$ and C$_{14}$H$_{29}$ and n represents the number of repeating units and has an average value of about 3; (d) RO(CH$_2$CH$_2$O)$_n$H where R is a mixture of C$_{12}$H$_{25}$ and C$_{14}$H$_{29}$ and n represents the number of repeating units and has an average value of about 6.3; (e) RO(CH$_2$CH$_2$O)$_n$H where R is a mixture of C$_{12}$H$_{25}$ and C$_{14}$H$_{29}$ and n represents the number of repeating units and has an average value of about 6.9; (f) RO(CH$_2$CH$_2$O)$_n$H where R is a mixture of C$_{12}$H$_{25}$ and C$_{14}$H$_{29}$ and n represents the number of repeating units and has an average value of about 7.2; (g) RO(CH$_2$CH$_2$O)$_n$H where R is a mixture of C$_{12}$H$_{25}$ and C$_{14}$H$_{29}$ and n represents the number of repeating units and has an average value of about 7.0; (h) RO(CH$_2$CH$_2$O)$_n$H where R is a mixture of C$_{12}$H$_{25}$ and C$_{14}$H$_{29}$ and n represents the number of repeating units and has an average value of about 8.3; (i) RO(CH$_2$CH$_2$O)$_n$H where R is a mixture of C$_{12}$H$_{25}$ and C$_{14}$H$_{29}$ and n represents the number of repeating units and has an average value of about 11.3; and mixtures thereof.

19. An ink composition according to claim 1 wherein the surfactant is selected from the group consisting of polyoxyethylene (10) stearyl ether, polyoxyethylene (20) stearyl ether, polyoxyethylene (10) cetyl ether, sodium dioctyl sulfosuccinate, sodium dodecyl sulfonate, cetyl trimethyl ammonium bromide, and mixtures thereof.

20. An ink composition according to claim 1 wherein the ink exhibits a liquid crystalline gel phase at a temperature of from about 10° to about 45° C.

21. An ink composition according to claim 1 wherein the ink exhibits a liquid crystalline gel phase at a temperature of from about 25° to about 40° C.

22. An ink composition according to claim 1 wherein the ink exhibits a liquid sol phase at a temperature of from about 15° to about 70° C.

23. An ink composition according to claim 1 wherein the ink exhibits a liquid sol phase at a temperature of from about 25° to about 65° C.

24. An ink composition according to claim 1 wherein the ink exhibits a liquid microemulsion phase at a temperature above about 65° C.

25. An ink composition according to claim 1 wherein the ink exhibits a liquid microemulsion phase at a temperature above about 75° C.

26. An ink composition according to claim 1 wherein the ink exhibits a viscosity of from about 2 to about 10 milliPascal-seconds when in the liquid microemulsion phase.

27. In a process which comprises incorporating into an ink jet printing apparatus an ink composition and causing droplets of the ink composition to be ejected in an imagewise pattern onto a substrate, the improvement comprising selecting an ink composition according to claim 1.

28. In a process which comprises incorporating into an ink jet printing apparatus an ink composition and causing droplets of the ink composition to be ejected in an imagewise pattern onto a substrate, wherein the ink is selectively heated in an imagewise pattern, thereby causing droplets of the ink to be ejected in an imagewise pattern, the improvement comprising selecting an ink composition according to claim 1.

29. In a process for generating images which comprises incorporating into an ink jet printing apparatus an ink and forming images by melting the ink and causing the melted ink to be expelled in droplets onto a substrate, thereby generating an image on the substrate, the improvement comprising selecting an ink composition according to claim 1.

30. A process which comprises incorporating into an ink jet printing apparatus an ink composition according to claim 1 and causing droplets of the ink composition to be ejected in an imagewise pattern onto a substrate.

31. A process according to claim 30 wherein the ink is selectively heated in an imagewise pattern, thereby causing droplets of the ink to be ejected in an imagewise pattern.

32. A process according to claim 31 wherein the substrate is maintained at a temperature above ambient temperature when droplets of ink are ejected onto the substrate.

33. A process for generating images which comprises incorporating into an ink jet printing apparatus an ink composition according to claim 1 and forming images by melting the ink and causing the melted ink to be expelled in droplets onto a substrate, thereby generating an image on the substrate.

* * * * *